United States Patent [19]

Smith et al.

[11] Patent Number: 5,315,786
[45] Date of Patent: May 31, 1994

[54] PLANTING TRAY

[76] Inventors: Thomas Smith, 1015 Indian Trail, Carleton, Mich. 48117; John P. Darin, 3905 La Playa La., Orchard Lake, Mich. 48234

[21] Appl. No.: 882,913

[22] Filed: May 14, 1992

[51] Int. Cl.$^5$ .............................................. A01G 23/02
[52] U.S. Cl. .......................................... 47/74; 47/86
[58] Field of Search ................................ 47/86, 85, 74

[56] References Cited

U.S. PATENT DOCUMENTS

| | | | |
|---|---|---|---|
| 1,200,396 | 10/1916 | Southard | 47/74 |
| 1,424,829 | 8/1922 | Kleb | 47/74 |
| 1,426,808 | 8/1922 | Bailey | 47/74 |
| 1,439,426 | 12/1922 | Lemke | 47/74 |
| 1,701,238 | 2/1929 | Kennedy | 47/74 |
| 1,846,274 | 2/1932 | Otwell | 47/33 |
| 1,954,424 | 4/1934 | Otwell | 47/33 |
| 3,014,614 | 12/1961 | Carroll et al. | 47/86 |
| 3,080,680 | 3/1963 | Reynolds et al. | 47/74 |
| 3,755,964 | 9/1973 | Rack | 47/74 |
| 3,889,416 | 6/1975 | Bergeron et al. | 47/86 |
| 4,050,188 | 9/1977 | van Wingerden | 47/85 |
| 4,434,576 | 3/1984 | Sowerwine | 47/39 |
| 4,495,725 | 1/1985 | Talbott | 47/86 |
| 4,586,288 | 5/1986 | Walton | 47/73 |
| 4,658,542 | 4/1987 | Holmberg | 47/86 |
| 4,785,578 | 11/1988 | Grene | 47/86 |
| 4,854,075 | 8/1989 | Greiling | 47/73 |
| 4,918,863 | 4/1990 | Youssef | 47/85 |

FOREIGN PATENT DOCUMENTS

| | | | |
|---|---|---|---|
| 768574 | 7/1954 | United Kingdom | 47/85 |
| 2201323 | 9/1988 | United Kingdom | 47/86 |

*Primary Examiner*—Ramon S. Britts
*Assistant Examiner*—Joanne C. Downs
*Attorney, Agent, or Firm*—Weintraub, DuRoss & Brady

[57] ABSTRACT

A planting tray for direct deployment of trays and plants is described. The tray is ideally formed of a sturdy, biodegradable material. The tray has a flat member with a specific matrix of openings formed therein. A plurality of baskets, in a specific deployment, are affixed to the flat member. The baskets have a plurality of perforations, so that the roots of plants, deployed in soil within the basket, can grow out therethrough. Thus, the tray with plants can be embedded within the ground without the need for transplanting. The deployment of the baskets affixed to the flat member is such that two trays of the present invention may be intermeshed for spaciously efficient deployment.

10 Claims, 3 Drawing Sheets

PLANTING TRAY

BACKGROUND OF THE INVENTION

1. Field of the Invention

The present invention concerns a planting tray. More particularly, the present invention concerns a planting tray wherein the plants and the tray may be planted in the ground without removing the plant from the tray.

2. Prior Art

Horticulturists practice the techniques of germinating seeds, starting unrooted cuttings, and transplanting propagating young plants in controlled environments, such as greenhouses, nurseries, and homes, or outdoors. By giving a young plant sufficient light, moisture and nutrients at the critical early developmental stage, the plant can develop a proper root system and become sturdy. The plant is then transferred to, usually, an outdoor environment, such as a garden.

There are, however, problems associated with these techniques. The transplanting of the young plant may induce a trauma in the plant, particularly to the root system. This trauma can interrupt the flow of nutrients to the plant. This will stunt the growth of the seedling or, in the extreme case, kill the plant. Other problems encountered include the loss of dirt, which can damage the root system, and possible physical injury to the plant. Thus, there is a need for a device to allow young plants to develop, while eliminating the damage incurred when transplanting.

One approach to satisfying this need is found in U.S. Pat. No. 4,918,863, issued Apr. 24, 1992 to Youssef. Youssef teaches a method for planting and germinating seeds, the seeds being planted in a germinating soil mix. The seeds and soil mix are held within the enclosures of an expandable honeycomb structure. The honeycomb is laid over a soil or similar medium. The seeds germinate in a defined, weed-free environment, with the root system growing downwardly into the soil.

Youssef, however, requires deployment of the honeycomb structure over the intended soil medium, so that the roots may grow thereinto. Thus, Youssef is not generally usable indoors or in most controlled environments. Further, the honeycomb structure loses dirt through its bottom, if it is moved after the dirt and seeds have been deployed therein. While Youssef does discuss the use of a plywood board as a base during indoor germination, the same difficulties of disrupting the soil, and thereby the root system of the seedlings and possible physical damage to the seedling, are encountered. Finally, Youssef forces development of the root system in a vertical direction, excluding horizontal growth. For many plants, this is decidedly a harmful and unfavorable situation.

What is needed is a device that will allow the young plants to develop in an enclosed environment and further allow that direct planting of the plant to a permanent soil medium without necessitating transplanting from the device. It is to this need that the present invention is directed.

SUMMARY OF THE INVENTION

The present invention is a tray for germinating seeds, starting unrooted cuttings and transplanting propagating young plants therein for later implanting in the ground. The tray according to the present invention comprises:

(a) a flat member having a plurality of openings; and
(b) a plurality of baskets, each having an open interior, the baskets being formed with the flat member such that one opening of the flat member communicates with the interior of one basket, the basket having a plurality of perforations formed therein.

The openings of the flat member of the tray of the present invention may be formed in a matrix, the matrix comprising a first coordinate and a second coordinate, the matrix being formed such that one coordinate is even and the other coordinate is odd.

The present invention may further be formed such that no two baskets within either coordinate are adjacent. The tray may further be formed of a biodegradable material.

For a more complete understanding of the present invention, the reader is referred to the following detailed description, which should be read in conjunction with the accompanying drawing. Throughout the following description and in the drawings, like reference numerals refer to like parts.

DETAILED DESCRIPTION OF THE PREFERRED EMBODIMENT

Referring now to FIGS. 1-5, there is shown the present invention, a planting tray 10 for use in a controlled environment and later deployment in a permanent soil medium (not shown). The tray 10 comprises a flat member 12 and a plurality of baskets 14.

The flat member 12 is substantially planar and rectangular. If desired, a different shape for the member 12 could be selected. A plurality of openings 16 are formed within the flat member 12. The openings 16 are arranged in a matrix formation, the matrix comprising a first coordinate or rows R and a second coordinate or columns C. It is noted that the designation of rows and columns is not absolute, but rather are selected for illustrative purposes to denote the two coordinates of a two-dimensional matrix. Thus, it is seen that where reference is made to rows, columns could be implied, and where columns are referenced, rows could be implied. What is important to note is that there is a first coordinate and a second coordinate for the matrix.

Figure 3:
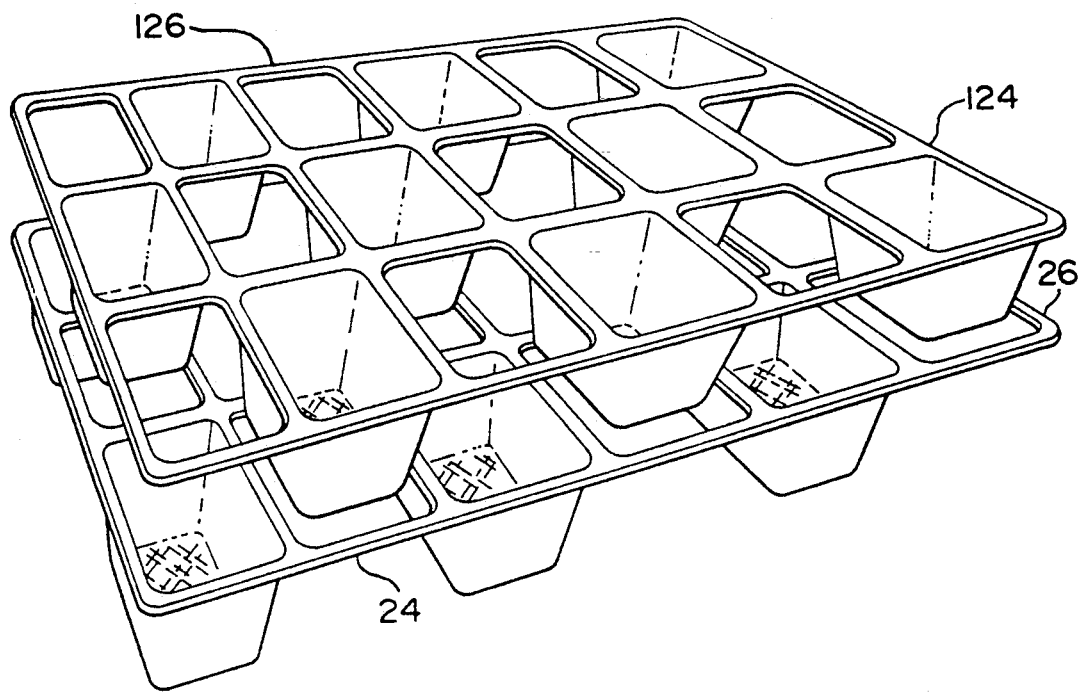
FIG. 3 is a perspective view of two planting trays of the present invention, the trays being partially intermeshed for storage in a controlled environment.
Figure 4:
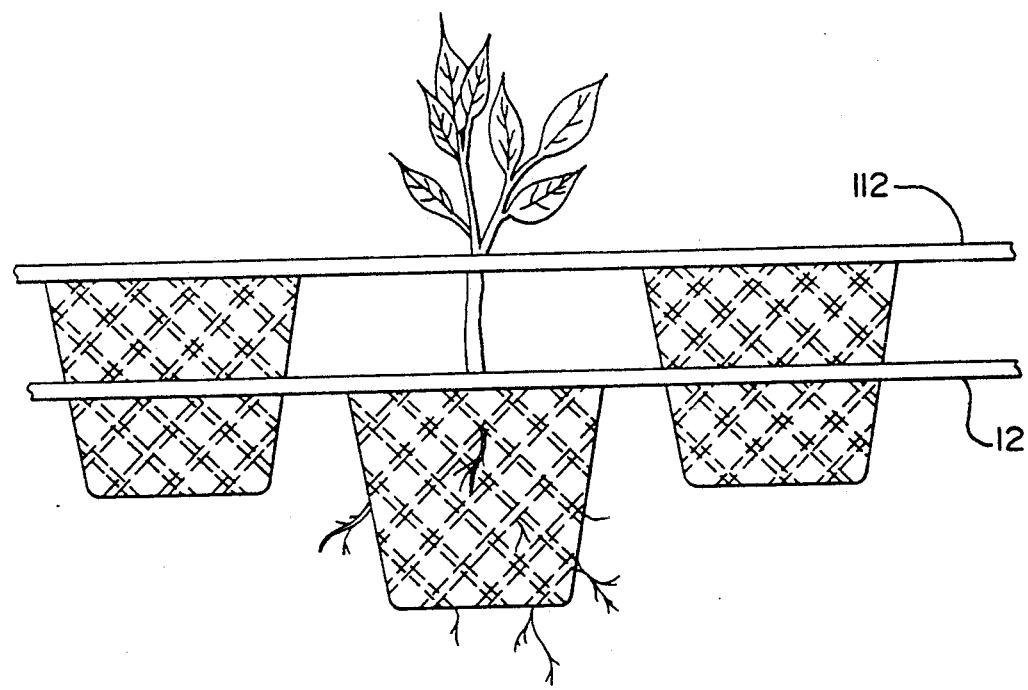
FIG. 4 is a side view of the partially intermeshed planting trays of FIG. 3.

The arrangement of the matrix of openings is critical for the practice of the present invention in its preferred embodiment. Specifically, the number of openings in each row must be even if the number of openings in each column is odd. Equivalently, the number of openings in each row must be odd if the number of openings in each column is even. This arrangement allows for the intermeshing or stacking of two identical trays 10, as shown in FIG. 3. Intermeshing affords efficient spacial deployment in a controlled or outdoor, above-ground environment or display, as will be more fully described herein further below.

The baskets 14 which contain soil as well as the plant, seed, etc., are formed in a generally cubic shape, having an upper opening 28, at least one side wall 30 and a bottom 32. As shown in FIGS. 1-4, a plurality of side walls 30 are formed with a taper. The upper perimeter of the side walls 30 define the upper opening 28, such that the open top 28 has a greater surface area than the bottom 32.

Figure 6:
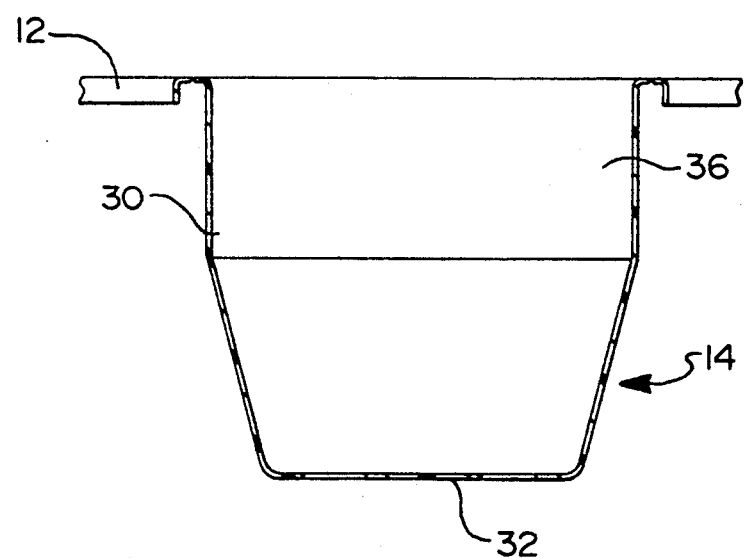
FIG. 6 is a side cross-sectional view of a planting tray basket with partially tapered sides.

It should be noted that the side walls 30 can be formed without a taper thereby effecting a basket 14 having a cubic structure (not shown). A second alternative or basket alternative is a substantially cylindrical structure (not shown). A third configuration is to have the side walls formed partially straight with the remainder of the wall having a taper extending to the bottom of the basket, as shown in FIG. 6.

The important criteria to be attached to the basket is the ability of the structure to hold soil or other planting medium therein, and to be stackable without regard to its geometric configuration.

Figure 5:
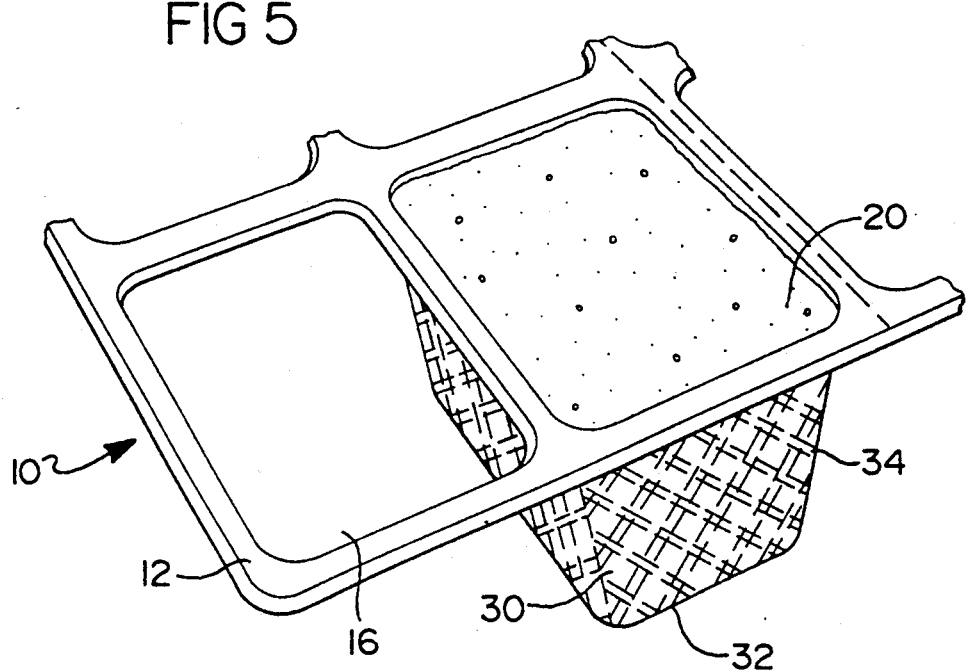
FIG. 5 is a perspective view of a planting tray basket with holes in the sides and bottom.

Referring, again to the drawings, the side walls 30 and the bottom 32 are formed of material identical to the flat member 12. The bottom 32 has a plurality of perforations 34 formed therein to enable any roots to grow through the basket. The side walls 30, also, may have a plurality of perforations likewise for the roots to grow therethrough, as shown in FIG. 5. The perforations 34 are depicted in FIGS. 1-5 as a plurality of intersecting slits disposed around the side walls 30 and bottom 32. The perforations 34 can alternatively comprise a multiplicity of apertures or other similar openings, as desired.

It is critical that the perforations 34 be small enough to prevent soil 20 held within the interior of the basket 14 from escaping therethrough, yet large enough to allow the roots of the plant to grow therethrough.

The side walls 30 and the bottom 32 cooperate to define an interior 36 therein. The interior 36 communicates with the open top 28 of the basket 14. Each basket 14 is affixed to the flat member 12 such that one opening 16 of the flat member 12 is in communication with the opening 28 of the basket 14, and may therefore communicate with the interior 36 of the basket 14. By this affixation, a user of the tray 10 may place soil 20 or other planting medium into the interior 36 of the basket 14, through the opening 16 in the flat member 12. A seed, unrooted cutting or a propagating young plant may then be placed within the soil 20 for growth.

Figure 1:
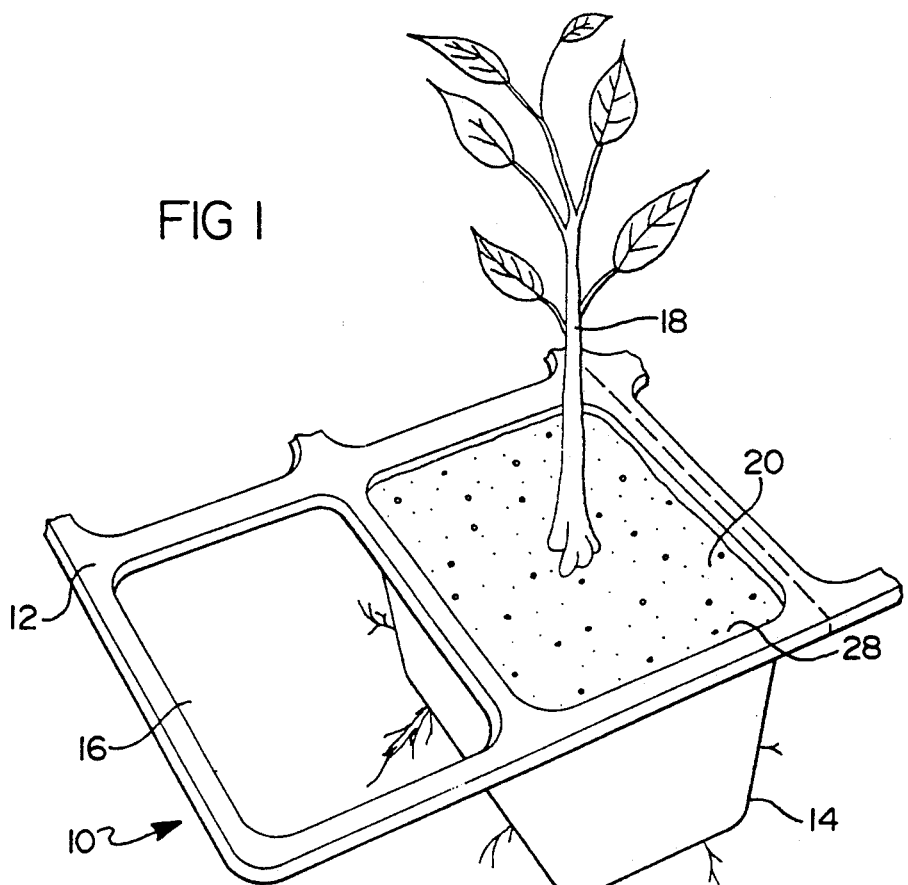
FIG. 1 is a perspective view of the planting tray of the present invention.
Figure 2:
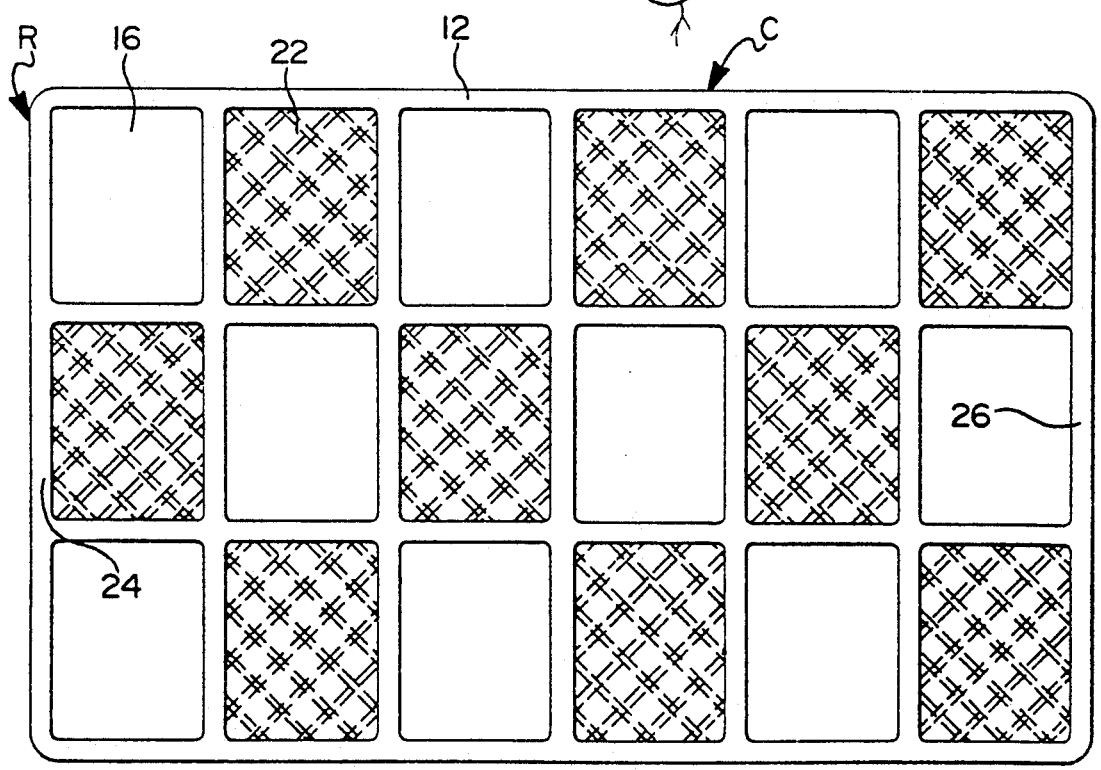
FIG. 2 is a top view of the planting tray of the present invention.

As can be seen in FIG. 2, the baskets 14 of the tray 10 have a specific deployment pattern. Specifically, and as shown, in each row R of the tray 10, no two baskets 14 are affixed to adjacent openings 16. Thus, there is an alternating arrangement of a basket, opening, basket, opening, etc. Similarly, the same arrangement is found in each column C of the tray 10, where no two baskets 14 are affixed to any adjacent openings in any column C.

The advantage of this deployment of baskets 14 on the tray 10 can be seen in reference to FIG. 3. Therein, a lower tray 10, having a first end denoted at 24 and a second end denoted at 26, the first end 24 being opposite of the second end 26, has deployed thereabove a second similar tray 10, the second tray having a first end 124 and a second end 126, the first end 124 being opposite the second end 126. The first end 124 of the second tray 110 is substantially identical to the first end 24 of the first tray, and likewise the second end 126 of the second tray is substantially identical to the second end 26 of the first tray. Likewise, the second tray 110 has a plurality of baskets 114, arranged in the same matrix configuration to that described hereinabove.

The carefully structured pattern of deployment of the baskets 14 or 114 allows for the intermeshing or stacking of the trays, such that no two baskets connected to the two trays will contact each other when the trays 10 and 110 are stacked. Thus, in the lower tray, each opening will receive therethrough a basket attached to the upper tray, and each opening having a basket thereunder will have mounted thereabove an opening without a basket on the upper tray, as shown. This design allows for the intermeshing or overlaying of two trays, such that space may be efficiently used during the indoor utilization of the tray 10 or 110. When permanent implantation in a soil medium outside the controlled environment is desired, the trays 10 may be separated easily and implanted individually in the ground. This design allows sufficient growing space between each deployed plant in the tray 10 or 110.

It is to be noted that to form a planting tray 10 having baskets 14 affixed thereunder does not require the pattern of the preferred embodiment of the present invention. Failure to utilize this pattern, however, will result in trays that cannot be intermeshed for effective indoor storing. It is noted that it would be possible to form a tray having every opening having a basket thereunder. This however would not allow sufficient growing space for many plants, and is a less desirable alternative.

Further, it is noted that the matrix combinations can be different from that defined in the preferred embodiment of the present invention. However, if different embodiments are elected, such as an even number of rows and an even number of columns, it is noted that the intended intermeshing cannot effectively occur. This is because these alternate deployments of the baskets would result in the placement of plants over the same openings in every tray, regardless of any rotation of tray orientation to effect intermeshing, two coordinated deployment patterns would be necessary. For example, in a matrix that has three rows and three columns, there could be a design having four baskets affixed to the flat member, and another design having five baskets affixed to each opening. This, however, would require the sale of the matching tray pairs so that the intermeshing and well-spaced plants could be achieved. None of the aforementioned problems are encountered when the matrix of the preferred embodiment is utilized.

Thus, in use, it is noted that a seed, unrooted cutting or propagating young plant can be planted in a soil medium held within the basket of the tray. Once the plant has begun to mature to the point where its root system is poking beyond the perforations of the basket, the entire tray may be transplanted into a permanent soil medium, whether that be in an outdoor landscaping environment or garden, a larger indoor planting container, or in an enclosed greenhouse. The plant may therefore continue its growth without the trauma of being transplanted from the tray 10. This further allows the plant to grow through the tray 10, as the tray 10 will not interfere with its growth. It is noted that in the preferred embodiment the tray 10 is formed of a biodegradable material. It is noted, however, that other suitable materials, such as plastic, could be utilized. This would require the tray be dug up and removed from the planting medium once the growing season is completed.

It is to be noted that the preceding discussion has concerned the preferred utilization of tray 10 of the present invention, namely to eliminate the trauma to the plants due to transplanting. The tray 10 of the present invention can also be utilized by professional horticulturalists in the large scale germination of seeds or the growth of cuttings.

Large scale germination occurs in flat beds having a great plurality of small cups. A seed is germinated in each cup. This facilitates the growth of a large number of plants in a small space. When greater space is necessary for proper plant growth, the seedlings are transferred from the flat bed to the tray 10 of the present invention. This allows the seedlings to fully develop its root systems, although trauma may occur during transplantation. The trays 10 may then be shipped to landscapers, nurseries or to be planted in the ground.

Having, thus, described the invention, what is claimed is:

1. A tray for germinating seeds and starting young plants, the tray and plants being directly plantable in the ground, the tray comprising:
   (a) a flat member having a plurality of openings formed therein, the openings being formed in a matrix having a first coordinate and a second coordinate; and
   (b) a plurality of baskets having at least one side wall and a bottom cooperating to define an open interior, the baskets being formed with the flat member such that one opening of the flat member is in communication with the interior of one basket, each basket having a plurality of perforations formed therein to allow roots of the plant to grow therethrough, the baskets being formed to the flat member such that no two baskets are formed in communication with two openings adjacent in either coordinate of the matrix.

2. The basket of claim 1, wherein the tray is formed of a biodegradable material.

3. The tray of claim 1, wherein the matrix has one coordinate being even and the other coordinate being an odd numeral.

4. The tray of claim 1, further comprising: a soil medium disposed within the interior of at least one of the baskets.

5. A tray for germinating seeds and starting young plants, the tray comprising:
   (a) a flat member having a plurality of openings formed therein, the openings being formed in a matrix having a first coordinate and a second coordinate; and
   (b) a plurality of baskets having at least one side wall and a bottom cooperating to define an open interior, the baskets being formed with the flat member such that one opening of the flat member is in communication with the interior of one basket, the baskets being formed to the flat member such that no two baskets are formed in communication with two openings adjacent in either coordinate of the matrix.

6. The trays of claim 5, wherein the tray is formed of biodegradable material.

7. A plurality of interstackable trays for germinating seeds and young plants and later implantation in the ground, the trays comprising:
   (a) a first tray having a flat member, the flat member having a plurality of openings formed therein in a matrix having a first coordinate and a second coordinate, the tray further having at least one basket formed thereto, each basket comprising at least one side wall and a bottom cooperating to define an interior, the interior of each basket being in communication with one opening of the flat member, each basket having a plurality of perforations formed therein; and
   (b) at least one additional tray, each additional tray having a flat member, the flat member having a plurality of openings formed therein in a matrix having a first coordinate and a second coordinate, the at least one additional tray further having at least one basket formed thereto, each basket comprising at least one side wall and a bottom cooperating to define an interior, the interior of each basket being in communication with one opening of the flat member, each basket having a plurality of perforations formed therein;
   wherein the at least one additional tray is stackable atop the first tray such that the baskets of the at least one additional tray protrude through the openings of the first tray and the flat member of the at least one additional tray rest upon the flat member of the first tray, and wherein further no basket of the at least one additional tray protrudes through an opening of the first tray which is in communication with any basket formed thereto.

8. The trays of claim 7, wherein the trays are formed of biodegradable material.

9. A plurality of interstackable trays for germinating seeds and starting young plants, comprising:
   (a) a first tray comprising:
      (1) a flat member having a plurality of openings formed therein, the openings being formed in a matrix having a first coordinate and a second coordinate; and
      (2) a plurality of baskets, each basket having at least one side wall and a bottom cooperating to define an open interior, the plurality of baskets being formed integrally with the flat member such that one opening of the flat member is in communication with the interior of one basket;
   (b) at least one additional tray, each additional tray comprising:
      (1) a flat member having a plurality of openings formed therein, the openings being formed in a matrix having a first coordinate and a second coordinate; and
      (2) a plurality of baskets having at least one side wall and a bottom cooperating to define an open interior, the plurality of baskets being formed integrally with the flat member such that one opening of the flat member is in communication with the interior of one basket;
   wherein the trays and their associated baskets may be stacked one upon another and no basket at any one matrix location of any one tray will coincide with a basket at the same matrix location of any additional tray.

10. The trays of claim 9, wherein the trays are formed of biodegradable material.

* * * * *